US011799979B2

(12) United States Patent
Sommer

(10) Patent No.: US 11,799,979 B2
(45) Date of Patent: Oct. 24, 2023

(54) PREDICTIVE RETARGETING SYSTEM AND METHOD

(71) Applicant: MarketChorus, Inc., Dallas, TX (US)

(72) Inventor: Matthew S. Sommer, Plano, TX (US)

(73) Assignee: MarketChorus, Inc.

( * ) Notice: Subject to any disclaimer, the term of this patent is extended or adjusted under 35 U.S.C. 154(b) by 155 days.

(21) Appl. No.: 16/599,474

(22) Filed: Oct. 11, 2019

(65) Prior Publication Data

US 2020/0112617 A1  Apr. 9, 2020

Related U.S. Application Data

(63) Continuation-in-part of application No. 15/988,052, filed on May 24, 2018, now Pat. No. 10,897,511.
(Continued)

(51) Int. Cl.
*H04L 67/50* (2022.01)
*H04L 65/403* (2022.01)
(Continued)

(52) U.S. Cl.
CPC ...... *H04L 67/535* (2022.05); *G06F 16/24578* (2019.01); *G06F 16/90335* (2019.01);
(Continued)

(58) Field of Classification Search
None
See application file for complete search history.

(56) References Cited

U.S. PATENT DOCUMENTS

| 11,258,868 | B2 * | 2/2022 | Tong | H04L 67/01 |
| 2007/0088801 | A1 * | 4/2007 | Levkovitz | H04L 67/20 |
| | | | | 709/217 |

(Continued)

FOREIGN PATENT DOCUMENTS

WO  WO-2007015228 A1 *  2/2007  ......... G06F 17/3002

OTHER PUBLICATIONS

Tene, Omer, and Jules Polenetsky. "To Track or Do Not Track: Advancing Transparency and Individual Control in Online Behavioral Advertising." Minnesota Journal of Law, Science and Technology, vol. 13, No. 1, 2012, pp. 281-358. (Year: 2012).*
(Continued)

*Primary Examiner* — Uyen T Le
(74) *Attorney, Agent, or Firm* — The Langley Law Firm, P.C.

(57) ABSTRACT

A method of detecting interest in a topic by user devices of a discoverable network includes building by a target server a vector index of articles accessible on a digital data network, querying for an item the vector index over the digital data network by a device, obtaining a set of articles by the target server corresponding to the item, feeding back by the target server over the digital data network, identifiers of the set of articles, to a network server of the discoverable network communicatively connected to the digital data network. The method may also include making accessible by the network server a set of addresses for user devices interacting with articles of the set of articles. The set of addresses of the user devices may be used for retargeting advertisements relevant to the topic.

15 Claims, 2 Drawing Sheets

Related U.S. Application Data which is a continuation of application No. 15/004,031, filed on Jan. 22, 2016, now Pat. No. 10,009,433, which is a continuation of application No. 14/186,192, filed on Feb. 21, 2014, now Pat. No. 9,276,974, which is a continuation-in-part of application No. 13/648,588, filed on Oct. 10, 2012, now Pat. No. 8,930,384.

(60) Provisional application No. 61/546,211, filed on Oct. 12, 2011.

(51) Int. Cl.
| | |
|---|---|
| *G06F 16/951* | (2019.01) |
| *G06F 16/9535* | (2019.01) |
| *G06F 16/903* | (2019.01) |
| *G06Q 50/00* | (2012.01) |
| *G06F 16/2457* | (2019.01) |
| *H04L 51/52* | (2022.01) |
| *H04L 51/56* | (2022.01) |

(52) U.S. Cl.
CPC ........ *G06F 16/951* (2019.01); *G06F 16/9535* (2019.01); *G06Q 50/01* (2013.01); *H04L 51/52* (2022.05); *H04L 51/56* (2022.05); *H04L 65/403* (2013.01)

(56) References Cited

U.S. PATENT DOCUMENTS

| | | | |
|---|---|---|---|
| 2007/0198339 A1* | 8/2007 | Shen | G06Q 30/0277 705/14.64 |
| 2008/0319986 A1* | 12/2008 | Shapira | G06F 16/9535 |
| 2009/0100047 A1* | 4/2009 | Jones | G06F 16/951 |
| 2012/0124630 A1* | 5/2012 | Wellen | H04N 21/8586 725/109 |
| 2013/0006898 A1* | 1/2013 | Phielipp | G06F 21/316 706/12 |
| 2016/0048880 A1* | 2/2016 | Linden | G06Q 30/0269 705/14.66 |
| 2017/0076007 A1* | 3/2017 | Knoll | G06Q 30/0255 |
| 2018/0357661 A1* | 12/2018 | Fadeev | G06Q 30/0242 |

OTHER PUBLICATIONS

Gábor György Gulyás, Gergely Acs, and Claude Castelluccia, "Near-Optimal Fingerprinting with Constraints", Proceedings on Privacy Enhancing Technologies ; 2016 (4):1-18. (Year: 2016).*

Paul Vines, Franziska Roesner, and Tadayoshi Kohno, "Exploring ADINT: Using Ad Targeting for Surveillance on a Budget—or—How Alice Can Buy Ads to Track Bob", Session 4: Probing, Fingerprinting, and other Deanonymization WPES'17, Oct. 30, 2017 , Dallas, TX, USA. ACM ISBN 978-1-4503-5175-1/17/10 (Year: 2017).*

\* cited by examiner

PREDICTIVE RETARGETING SYSTEM AND METHOD

CROSS-REFERENCE TO RELATED APPLICATIONS

The present application is related to and incorporates herein by reference U.S. patent application Ser. No. 15/988,052 titled "Topical Activity Monitor and Identity Collector System," filed May 24, 2018, which priority application is a continuation of U.S. patent application Ser. No. 15/004,031 titled "Topical Activity Monitor and Identity Collector System" filed Jan. 22, 2016 and issued on Jun. 26, 2018 as U.S. Pat. No. 10,009,433, which priority application is a continuation of U.S. patent application Ser. No. 14/186,192 titled "Topical Activity Monitor and Identity System and Method," filed Feb. 21, 2014, and issued on Mar. 1, 2016 as U.S. Pat. No. 9,276,974, which priority application is a continuation in part of and has benefit of priority of U.S. patent application Ser. No. 13/648,588, titled "Topical Activity Monitor System and Method," filed Oct. 10, 2012 and issued on Jan. 6, 2015 as U.S. Pat. No. 8,930,384 (a conversion of U.S. Provisional Patent Application No. 61/546,211, filed Oct. 12, 2011). The application Ser. No. 15/988,052 has at least one same inventor of the present application.

TECHNICAL FIELD

The invention generally relates to identification in computer network systems, and more particularly relates to retargeting advertisements to selectively identified user devices of a social media network based on network activity of the user devices related to particular topics of interest to the user devices.

BACKGROUND

Retargeting is an online advertising practice. In general, a user device visiting a website is tracked on the website and then (re)targeted ads relevant to the user device access to the website are later delivered to the user device as it visits other websites. The practice is performed by placing a pixel (e.g., JavaScript tag) in a website. The pixel creates a list of user devices who visit the website and places anonymous "cookies" in the browsers of the user devices. The cookies, together with the list of user devices, allow the further advertising (or "retargeting").

Although retargeting has been determined to have some level of effectiveness in obtaining "conversions" (i.e., sales or other particular interactions with user devices), retargeting has often been limited because the group of user devices reached by the retargeting do not necessarily have particular interest in the subject for conversion. In other words, retargeting, in general, can be somewhat effective because it focuses on those user devices having reached a website page or feature. It has not, however, provided any optimized delivery of most relevant topical items to relevant user devices.

Articles, advertisements, software, files, apps, and other information and content items (collectively, "articles") are often published (i.e., made accessible to others) for access via websites by user devices communicatively connected to the network. User access or interaction with a respective article has at times been monitored to measure indications of user activity and interest in the item. User activity and interest as to any particular individual item, however, has typically been monitored and measured only as to the specific, individual item.

It would, therefore, be a significant improvement in the art and technology to provide improved computer and network communications to identify particular user devices having interest in particular topical items as reference for retargeting.

SUMMARY

An embodiment of the invention includes a method of detecting interest in a topic by user devices of a discoverable network. The method includes building by a target server a vector index of articles accessible on a digital data network, querying for an item the vector index over the digital data network by a device, obtaining a set of articles by the target server corresponding to the item, compiling by the target server over the digital data network, identifiers of the set of articles; and creating a set of user devices relevant to the identifiers.

Another embodiment of the invention includes a system for determining user devices interactive with a topical item. A digital data network is communicatively connected to an article server. The system includes a processor communicatively connected to the digital data network, memory communicatively connected to the processor, and a database communicatively connected to the processor. The memory includes instructions for processing by the processor for building a vector index of articles accessible from the article server via the digital data network, receiving a query for an item corresponding to at least one article of the vector index, obtaining identifiers of a set of articles corresponding to the item, compiling the identifiers of the set of articles; and creating a set of the user devices of the digital data network relevant to the identifiers.

BRIEF DESCRIPTION OF THE DRAWINGS

The present invention is illustrated by way of example and not limitation in the accompanying figures, in which like references indicate similar elements, and in which.

DETAILED DESCRIPTION

Figure 1:
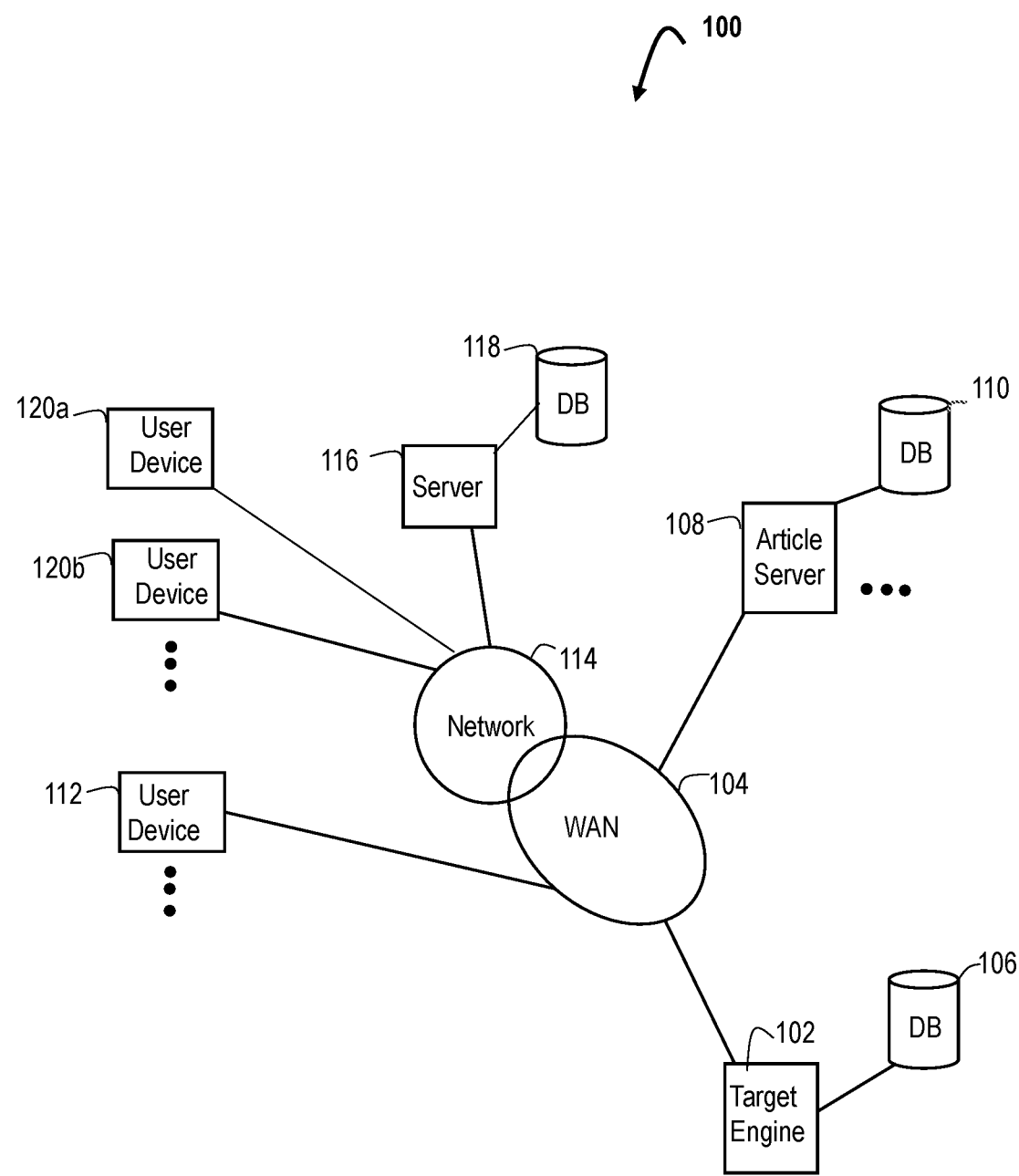
FIG. 1 illustrates a system for retargeting advertising to select user devices interested in a topic, according to certain embodiments of the invention.

According to certain embodiments, in a computer network system, retargeting is performed or made possible by specialized computers and devices over a digital data network for select user devices and select topics.

As used in this disclosure, the term "article" comprises a digital artifact of a network or of a device or element of or communicatively connected to the network, which is usually processable or producible (e.g., displayed, edited, output) by a device communicatively connected to the network, and includes but is not limited to any of file, document, advertisement, software program, app, picture, graphic, object, video, YouTube video, or content item capable of being digitally represented in a storage, computer, or communicated signal of or communicatively connected to the network or available for access by computers or devices connected to the network. Certain nonexclusive examples of such an article include a press release related to a particular company, or event, product or service of the company; a publication that is a company website or social media website post related to a particular company's stock or a consumer item (e.g., coffee, movie, or another product or service); a software program, script, code, video or other program or file available from or interactive with a website or computer connected to the network, representing an action processable by a microprocessor device to obtain a result (e.g., including, without limitation, what is commonly known as an "app"); advertisement for any of a wide variety of consumer, business or other products or services offered or other notice or announcement, available from the network as pop-up, push, download or in any other manner; and numerous other examples of articles obtainable via communicative connection to the network are possible (e.g., flash programs, cookies, website statistics, and others). Additionally, in other nonexclusive examples, an article can be or include a link to another distinct or related article, such as a hyperlink, identifier, or locator, or a location or other link or referral source (e.g., a social media "like" or "share" of a web pointer to a content, information or other item). These various articles are "published" (e.g., broadly including, but not limited to, uploaded, stored, pushed, or otherwise provided or delivered or made accessible via communications over the network) by one or more source device communicatively connected to the network, for access by another device communicatively connected to the network.

In certain non-exclusive embodiments, articles are available for access by a server communicatively connected to the network system. These articles are hosted or accessible on websites, other servers, or other host devices of the network, for access by the server. Each article references or represents one or more particular topical item.

Generally, embodiments employ topics of online content to identify from social media networks, corporate or enterprise networks, and/or other similar communicative networks, the user devices of those networks likely to have interest in the topics. A server builds index(es) corresponding to articles accessible on a network, such as the Internet or other network. Queries of the index(es) yields a set of articles having relevance to the query. The articles assembled from the query are then employed to identify in the social media and other networks any user devices interacting within these networks relevant to the set of articles. Access, viewing, downloading, operating/processing, and other interaction with the articles is a proxy to interest of the user devices in the particular topic of the articles. Sharing/Liking/Interactions via social/online communities of communicatively connected devices, and users of the devices, with content the same or similar to a particular topic of the articles is determined and applicable user devices identified and collected as a set of user devices having interest in particular topic for purpose of retargeting.

Referring to FIG. 1, a system 100 includes a target engine 102 communicatively connected to a wide area data network 104. A non-exclusive example of the network 104 is the Internet or another network or networks, comprised of wired, wireless or any other applicable digital communicative links. The target engine 102 is comprised of circuits, software stored in memory and processed by a data processor, and/or combinations of these. The target engine 102 may comprise a data processor, as non-exclusive example, a server computer or computers or other computer(s) or processor(s) having or connected to communicative elements for communication on the network 104.

The target engine 102 includes or is communicatively connected to a database 106. The database 106 is comprised of circuits, software stored in memory, and/or combinations of these. The database 106, as non-exclusive example, is one or more relational database. The database 106 is processed by or in conjunction with the target engine 102.

An article server 108 is communicatively connected to the network 104. The article server 108 is communicatively connected to or includes, in whole or part, an article database 110. The article database 110 includes one or more articles. An example of the article server 108 is a website server computer that presents articles to devices accessing the server 108 over the network 104. The article server 108, either alone or in conjunction with the article database 110, as well as possibly but not necessarily other processors, databases and/or communicative devices, presents articles to the network 104. The target engine 102 communicatively connects to the article server 108, such as by the network 104 or other networks or links. Although a single article server 108 is illustrated, there can be one or more of the article server 108 communicatively connected to the network 104.

In operation, the target engine 102 accesses articles from the article server 108. The article server 108, in conjunction with the article database 110 or otherwise, serves (i.e., delivers, pushes, pulls or renders otherwise accessible) the articles to the target engine 102. The target engine 102, in conjunction with the database 106 or otherwise, builds one or more index (not shown in detail in FIG. 1) in vector space for some or all of the articles accessible from the article server 108. As non-exclusive example, elements of each page of each article, such as URL (Uniform Resource Locator) for access to the article, text on page (e.g., article title, article body), or other elements of the article, are indexed by the target engine 102. The target engine 102 may store the respective elements of each article as an index in vector space in the database 106. In certain non-exclusive embodiments, the target engine 102, substantially continually, intermittently or on command, searches the network 104 for article servers in order to build index of articles available from those servers over the network 104.

One or more user device 112 is communicatively connected to the network 104. The user device 112 is a digital data communications device, such as, for non-exclusive example, a computer, a smart phone, a tablet, or other processor or communicative equipment. The user device 112 is capable of accessing the target engine 102 over the network 104. In certain non-exclusive embodiments, the target engine 102 presents a web page for access by the user device 112 over the network 104. In other non-exclusive embodiments, the user device 112 includes an app or other program that when processed via the user device 112 communicatively accesses the target engine 102 over the network 104.

The user device 112 accesses the target engine 102 in order to perform a query. For example, the user device 112 may input a word, phrase, symbol, article, or other item, for non-exclusive example, into a form on the user device 112 or presented to the user device 112 by the target engine 102. The user device 112 communicates the item to the target engine 102 over the network. In response to the item from the user device 112, the target engine 102 performs a search of the database 106 for articles related to the item.

The target engine 102 determines any articles that relate to the query item. The target engine 102 queries one or more discoverable network 114, such as a social network (e.g., Facebook) or other network that is segregated or distinct in the sense that centralized servers of the network manage communications of devices of the network and obtain respective analytical data of those communications and make the data available for access. Each discoverable network 114 is communicatively connected to the target engine 102 via the network 104. Each discoverable network 114 may be included, in whole or part, in the network 104, or otherwise communicatively connected to the network 104. Each discoverable network 114 is managed by one or more network server 116 communicatively connected to the discoverable network 114. Each network server 116 is communicatively connected to one or more network database 118. Each network server 116, in conjunction with respective network database 118, operates the applicable discoverable network 114 and intermediates communications on the discoverable network 114. The network server 116 is comprised of circuits, software stored in memory and processed by a data processor, and/or combinations of these. The network server 116 may comprise a data processor, as non-exclusive example, a server computer or computers or other computer(s) or processor(s) having or connected to communicative elements for communication on the discoverable network 114 and the network 104, if differentiated from the discoverable network 114.

One or more user device 120a, 120b is communicatively connected to the discoverable network 114. Each user device 120a, 120b is a digital data communications device, such as, for non-exclusive example, a computer, a smart phone, a tablet, or other processor or communicative equipment. The user devices 120a, 120b access articles available via the network server 116, which articles may include but are not limited to posts, pages, communications, likes, or other items. The user devices 120a, 120b may also communicate articles among themselves over the discoverable network 114, as intermediated by the network server 116.

The network server 116 collects count data associated with the actions of each user device 120a, 120b within the discoverable network 114. This count data is accessible from the network server 116 over the network 104. The target engine 102, responsive to a query item from the user device 112, determines articles related to the query item. The target engine 102 communicatively contacts the network server 116 over the network 104, and the network server 116 determines count data related to the articles related to the query item. The network server 116 collects the set of URLs for the articles and identifies the user devices 120a, 120b interacting with the articles. These identifications of user devices 120a, 120b may be (re)targeted for advertising relevant to the articles by the network server 116, alone or in combination with other devices.

In certain non-exclusive alternatives, the identifications of user devices 120a, 120b may be accessed from the network server 116 by other device communicatively connected to the discoverable network, and these other devices, alone or in combination with yet other devices, may retarget or otherwise interact with the identified user devices 120a, 120b or otherwise act.

In certain non-exclusive embodiments, an ad platform, for example, an ad server device, obtains the URLs and set of identified user devices. The ad platform may obtain the URLs and set of identified user devices through access to the network server 116, the target engine 102 or otherwise. The ad platform may use the URLs and identities for advertising over the network 104 and/or the discoverable network 114 to the user devices 120a, 120b.

In certain non-exclusive alternatives, the target engine 102 and the database 106, together in whole or part, serve over the network 104 articles and comprise the article server 108. In other non-exclusive alternatives, the network server 116 includes, in whole or part, the target engine 102 and database 106. In even further non-exclusive alternatives, queries are automatically generated by the target engine 102 and the target engine 102 collects sets of URLs and user devices are identified for access by ad platform(s). In other non-exclusive alternatives, the target engine 102, in whole or part, provides the ad platform(s). Numerous other alternatives are possible.

Figure 2:
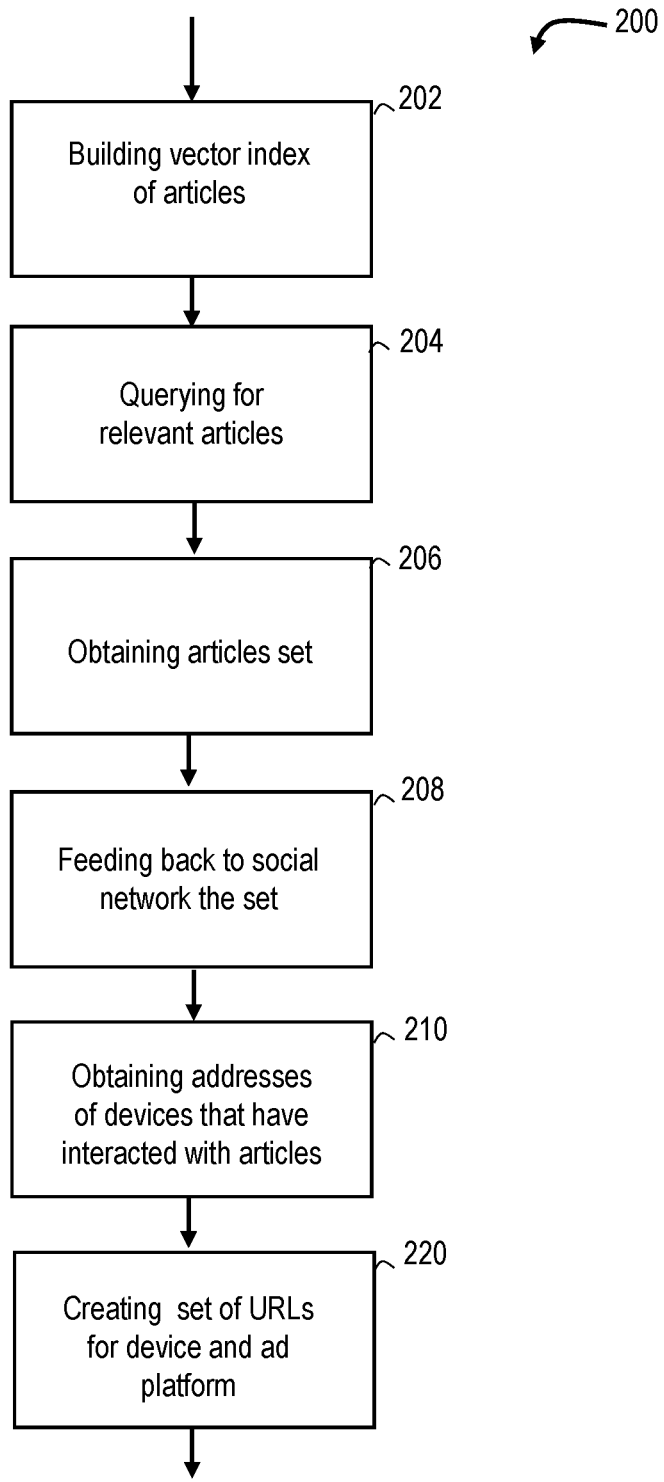
FIG. 2 illustrates a method of retargeting advertisements to select user devices interested in a topic, according to certain embodiments of the invention.

Referring to FIG. 2, a method 200 includes building a vector index of articles. The articles are accessible over a data communications network by a target server computer. The articles may be any of a wide variety of digital items or artifacts. One or more article server is communicatively connected to a digital data network. The target server computer accesses the articles from the article server over the network. The target server computer includes a data processor and communicative devices communicatively connected to the network. The target server computer may include or communicatively connect to one or more database for storage of vector index(es) corresponding to the articles accessed. Each article server includes a data processor and communicative elements communicatively connected to the network.

In certain non-exclusive examples, the network is the Internet, another wide area network, a local area network, other digital data communications network, and/or combinations. The network may be wired, wireless, other links, and/or combinations of these.

A user device is communicatively connected to the target server computer. The user device includes communicative elements for query input to the target server computer. In certain non-exclusive examples, the user device is a desktop computer, laptop, smart phone, tablet, other processing device or processor. In other non-exclusive examples, the user device communicatively connects to the network for input to the target server computer over the network. In yet other non-exclusive examples, the target server computer may act as the user device, such that input to the target server computer is direct via keyboard, mouse, touchpad, touch screen, or other device of the target server computer.

The method 200 further includes querying 204 the target server computer by the user device. The querying 204 finds relevant articles of the index(es) of the target server computer (and associated database, as applicable) corresponding to an input or other query item. The target server computer maintains record of the relevant articles from querying 204.

The network may include, in whole or part, or communicatively connect, in whole or part, to a social communications network or other network. The social communications network or other network is communicatively connected to one or more social network server or other server. The social communications network or other network is also communicatively connected to one or more user device of the social communications network or other network. The social network server or other server intermediates communications on the social communications network with and among the user devices of the social network or other network. The social network server or other server maintains data counts of actions of the user devices of the social or other network, with respect to articles.

Each social or other network server includes a data processor and communicative devices communicatively connected to the social or other communications network. The communicative devices also communicatively connect to the digital data network. The social network or other server may include or communicatively connect to one or more database for storage of data counts and identities of user devices associated with the data counts in the social network or other network. Each of these user device includes communicative elements communicatively connected to the social or other communications network, as well as possibly input, output, display, processor and other elements.

The method 200 also includes obtaining a set of articles 206 by the target server corresponding to the querying 204. The set of articles is obtained by the target server computer by search of the index(es) of the database for relevant articles. The relevant articles so indexed form the set.

The set of articles is fed 208 by the target server computer over the network to an application program interface (API) of the social or other network server. The feeding 208 requires that applicable requests be made by target server computer to the social or other network server via the API. The social or other network server responds to the target server computer over the network with identifications of user devices related to the articles in the social or other network.

The social or other network server builds a set of network addresses (e.g., URLs) of user devices 210 from the identifications received from the social or other network server. This set of addresses of user devices corresponds to those user devices relevant (i.e., most interested) in the particular articles of the set of articles obtained 206 by the target server computer.

The social or other network server creates 212 a set of the network addresses for the user devices of the set and for ad platforms. For non-exclusive example, the set is actionable for advertising in the social or other network server, via the digital data network, for one or more advertisement servers communicatively connected to the network. Alternately, the social or other network server communicatively delivers of otherwise makes accessible or useable the set to the advertisement server(s) according to an API of the advertisement server. The advertisement server(s) thereby may have available identities of a set of addresses of user devices that have interest in topics of the set of articles.

According to certain embodiments, identities of actor devices obtained from social or other networks are accessed and employed to retarget advertising. Segments or classifications of identities are possible, for example, specific segment or classification may be ordered based on actor communicative activity in respect of articles, items or other interests.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications, substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A method of detecting interest in a topic by user devices of a discoverable network, comprising:

building by a target server a vector index of articles accessible on a digital data network from at least one article server of the digital data network;

querying the target server by a requester device over the digital data network, for a topical item of the vector index;

obtaining a set of articles by the target server corresponding to the topical item;

compiling by a network server of the discoverable network, identifiers of the user devices of the discoverable network interactive in the discoverable network with the set of articles;

accessing by the target server the network server of the discoverable network;

receiving the identifiers of the user devices, by the target server from the network server; and responding to the requester device by the target server over the digital data network, with the identifiers of the user devices interactive in the discoverable network with the set of articles.

2. The method of claim 1, further comprising:
retrieving by the target server from the network server a set of addresses for user devices interacting on the discoverable network with articles of the set of articles.

3. The method of claim 2, further comprising:
making accessible by the target server to an ad platform server, the set of addresses.

4. The method of claim 3, further comprising;
delivering an advertisement to the user devices of the set of addresses, the advertisement relevant to the item.

5. The method of claim 2, further comprising:
delivering an advertisement to the user devices of the set of addresses, the advertisement relevant to the item.

6. The method of claim 1, wherein building includes searching by the target server for an article server communicatively connected to the digital data network, detecting by the target server articles of the article server, indexing the articles of the article server, and storing a vector index of the articles by the target server.

7. The method of claim 6, wherein storing places the vector index in a database communicatively connected to the target server.

8. The method of claim 1, wherein the requester device of querying is the target server.

9. The method of claim 1, wherein a plurality of network servers are communicatively connected to a plurality of discoverable networks, the target server builds vector indexes of pluralities of articles from a plurality of article servers of the plurality of discoverable networks, respectively, the target server obtains the set of articles corresponding to the item, the network servers compile identifiers of interactions of the user devices of the discoverable networks, respectively, with the set of articles for the plurality of discoverable networks, respectively, and the network servers make accessible sets of addresses of user devices of the identifiers of interactions with the articles of the set of articles.

10. The method of claim 9, further comprising;
delivering an advertisement to the user devices of the sets of addresses, the advertisement relevant to the item.

11. A system for determining identifiers within a social media network of user devices interactive with a topical item in the social media network, a digital data network is communicatively connected to an article server, comprising:

a processor communicatively connected to the digital data network and the social media network;

memory communicatively connected to the processor;

a database communicatively connected to the processor;

the memory includes instructions for processing by the processor for:

building a vector index of articles accessible from the article server via the digital data network;

obtaining a set of articles from the vector index of articles, the set of articles corresponds to the topical item;

receiving a query relative to the topical item;

feeding back the set of articles to a network server of the social media network; and collecting from the network server the identifiers of user devices of the social media network interactive with the set of articles, as proxy to user devices interested in the topical item.

12. The system of claim 11, wherein the identifiers of user devices include network addresses of the user devices interacting with articles of the set of articles.

13. The system of claim 12, wherein the memory includes instructions for processing by the processor for:

creating a set of the addresses for the user devices.

14. The system of claim 12, wherein the memory includes instructions for processing by the processor for:

supplying the network addresses to an advertisement server.

15. The system of claim 12, wherein the memory includes instructions for processing by the processor for:

retargeting an advertisement to the user devices at the network addresses, the advertisement is relevant to the topical item.

\* \* \* \* \*